Fig. 1

INVENTORS.
JACK D. ZEFF
ROBERT A. BAMBENEK
CYRIL M. TOMSIC
BY
Lawrence S. Epstein
ATTORNEY United States Patent Office 3,497,312
Patented Feb. 24, 1970

3,497,312
ATMOSPHERE REGENERATION METHOD FOR CLOSED ENVIRONMENTAL VEHICLES
Jack D. Zeff, Highland Park, Robert A. Bambenek, Glenview, and Cyril M. Tomsic, Chicago, Ill., assignors, by mesne assignments, to the United States of America as represented by the Secretary of the Navy
Filed Jan. 23, 1964, Ser. No. 339,826
Int. Cl. B01d 53/00, 53/04, 53/34
U.S. Cl. 23—4
1 Claim

ABSTRACT OF THE DISCLOSURE

Method of regenerating a spent atmosphere containing one or more of hydrogen, methane, sulfites, phosphites, carbon monoxide, hydrogen sulfide and heavy hydrocarbons as contaminants comprising subjecting the spent atmosphere to catalytic oxidation to convert hydrogen to water, carbon monoxide to carbon dioxide and methane and other hydrocarbons to carbon dioxide and water; passing the oxidized gas through activated carbon whereby sulfites, sulfides and phosphites are absorbed; passing the resulting gas containing carbon dioxide into contact with a bed of silver oxide to remove the carbon dioxide; desorbing the carbon dioxide and reducing it with carbon by catalytic reduction with hydrogen; condensing the resultant water vapor and forming hydrogen and oxygen therefrom by electrolysis; passing the hydrogen to the carbon dioxide reduction step and passing the oxygen to the gas passing from the bed of silver oxide.

---

This invention relates to an atmosphere regeneration system and more particularly is intended to recover exhausted air for reuse in the same room.

It may be desirable, under certain conditions, to treat exhausted or spent air in such manner as to regenerate fresh air. This would be true in submarines where considerable periods of time are spent under the surface of the water and in the small confines of the submarine fresh air is rapidly exhausted. This could also be true under certain conditions in mines where a source of fresh air is not available due to noxious gases in the atmosphere. Another reason to recover fresh air would be in manned space ships where there is no external source of fresh air and the flight time is greater than the supply of fresh air in the cabin.

In the latter case, recovery systems have been explored. For example, a semi-closed system takes advantage of the exhaled oxygen in the open system by absorbing the waste products, carbon dioxide and water vapor, and recirculating the oxygen. Make-up oxygen is added. Open systems have been utilized with high altitude aircraft and use of a demand regulator to supply oxygen.

However, for extended flights into outer space, a closed system utilizing carbon dioxide reduction and electrolysis appears to be most advantageous, particularly for programmed flights. Accordingly, the atmosphere recovery system of the invention provides a preferred example of such a recovery system. The instant invention provides the chemical conversion of carbon dioxide to oxygen and the recovery of expired water vapor. While several processes to convert carbon dioxide to oxygen have been explored, the preferred method reduces carbon dioxide by hydrogen with the electrolysis of the by-product ($H_2O$).

An important object of the invention is to provide an atmospheric regeneration system whereby spent air is regenerated to provide pure air for breathing purposes.

It is another object to regenerate the atmosphere in a confined space so that the original air may be used over and over again.

It is yet another object to regenerate oxygen through the use of activated charcoal beds through a combination of heat and reduction of pressure.

It is still another object to provide an emergency atmosphere system adapted to operate in the event of the failure of the principal system.

It is still another object to control the temperature and humidity of the regenerated atmosphere when it is returned to be used again.

It is another object to provide hydrogen and oxygen regeneration so that there is never any mixture between the two, even though they are maintained within a single chamber.

Other objects and many of the attendant advantages of this invention will be readily appreciated as the same becomes better understood by reference to the following detailed description when considered in connection with the accompanying drawings wherein:

FIG. 4 illustrates the electrolysis unit.

Figure 1:
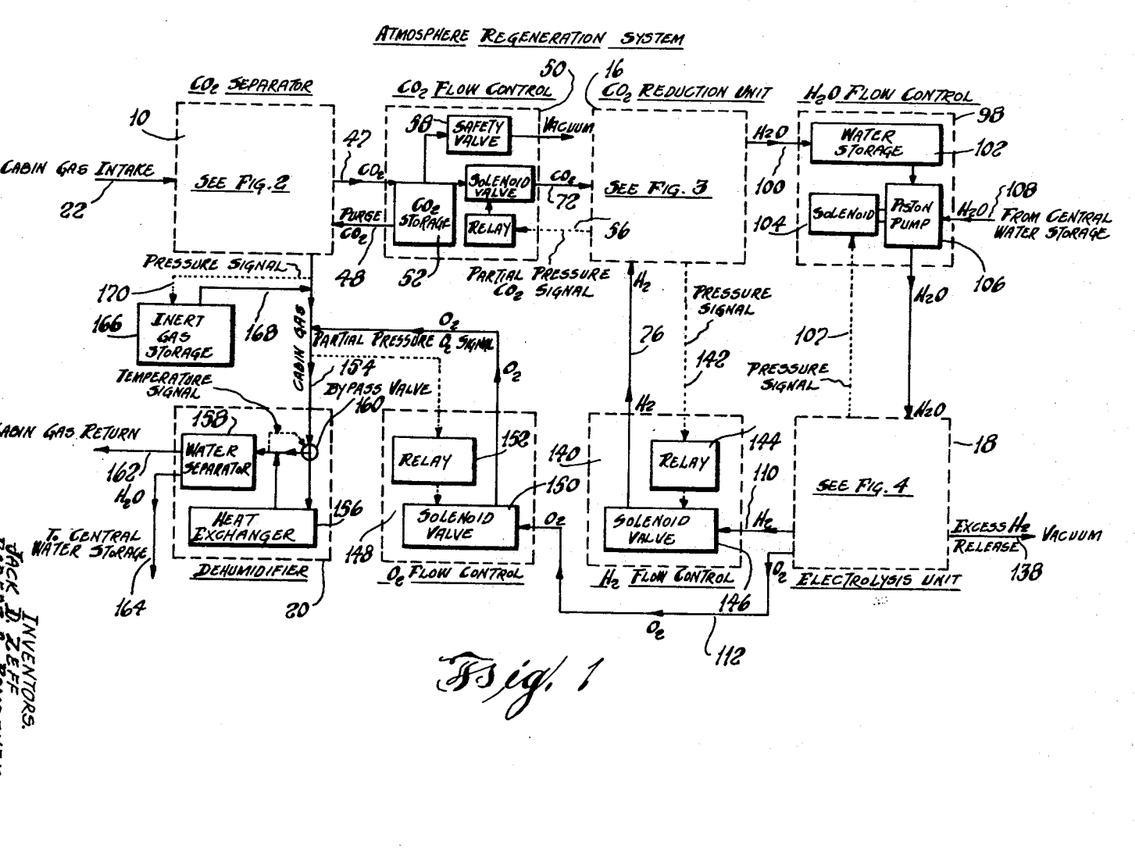
FIG. 1 is a diagrammatic illustration of the overall atmosphere regeneration system.

Referring to FIG. 1, the principal components of the system include a $CO_2$ separator 10, a carbon dioxide reduction unit 16, an electrolysis unit 18, and a cabin gas dehumidifier 20. The $CO_2$ separator 10, which is later described with reference to FIG. 2, includes a catalytic combustion chamber 24, an activated carbon bed 12, and a silver oxide absorption column 14.

Gas is taken from the cabin as shown by flow line 22 and passed through the catalytic combustion chamber 10 to oxidize, at a controlled rate, undesirable gases such as hydrogen, methane, carbon monoxide, and hydrogen sulfide into forms that are suitable for adsorption or condensation further downstream. From the catalytic combustion chamber the cabin gas passes through the activated carbon bed 12 in order to adsorb the sulfites, phosphites, and heavy hydrocarbons that were formed in the catalytic combustion chamber or were present in the influent gases. After passing through the charcoal bed the gases are passed to a bed of silver oxide at 14 where carbon dioxide is removed. The carbon dioxide absorbed by the silver oxide bed is regenerated, concentrated, and fed to the carbon dioxide reduction unit 16. The carbon that is produced by reaction is stored while the oxygen that was originally present in the carbon dioxide is combined with hydrogen and removed from the system, in the form of water. This water is fed to the electrolysis unit 18 where it is decomposed into gaseous hydrogen and oxygen. The hydrogen is fed back to the carbon dioxide reduction unit 16 and the oxygen is accumulated and introduced into the cabin gas stream upon demand.

The last principal item of equipment within the system is the dehumidifier 20. The flow of cabin gas through the dehumidifier is controlled so that the gases emerging from the panel are at 51° F. and 100% relative humidity. When the gases are warmed by the absorption of excess metabolic heat to the cabin temperature of 70° F., the desired relative humidity of 50% is attained.

Figure 2:
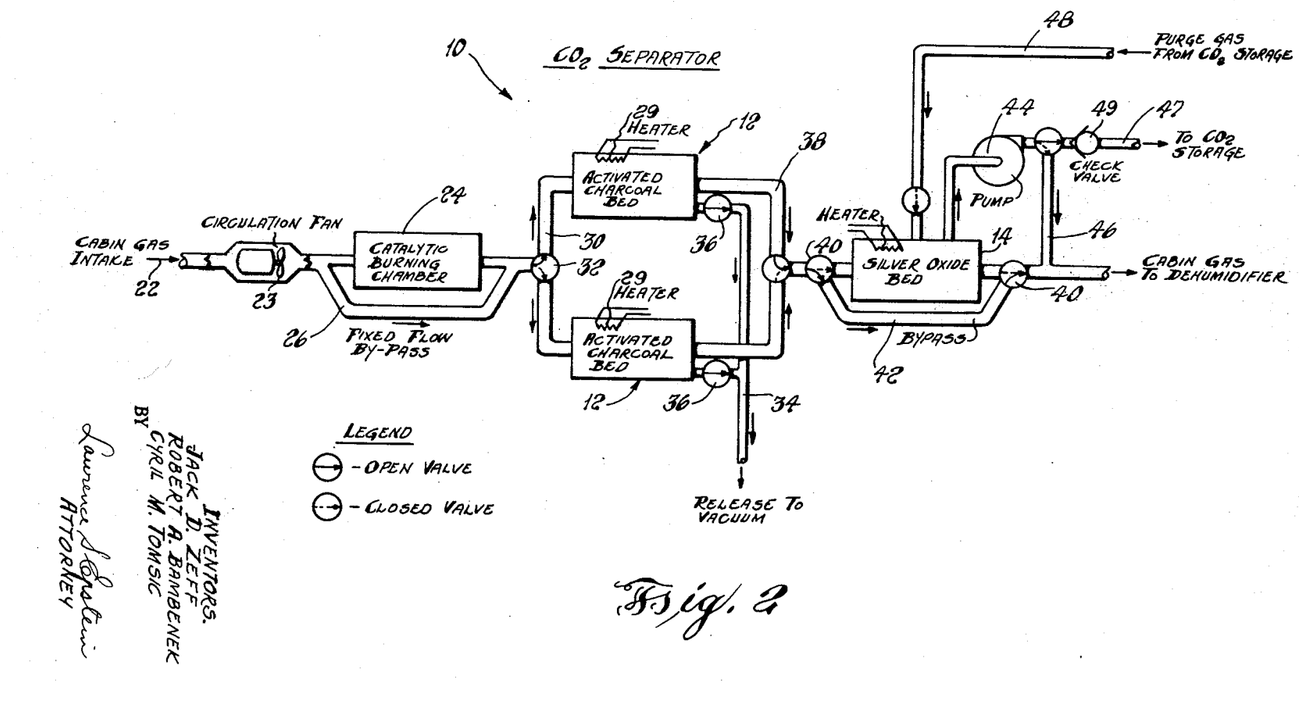
FIG. 2 illustrates in detail the catalytic chamber.

The carbon dioxide separator 10, shown in detail in FIG. 2, takes a fixed percentage of cabin gas air flow by means of the circulation fan 23 and subjects it to controlled combustion. The catalyst within the burning chamber 24 could be a platinum alloy coating on Nichrome wire. A fixed flow by-pass 26 is also provided to by-pass the catalytic burning chamber 24 and feed directly to the activated charcoal beds 12. Electric heating of the Nichrome wire 29 would provide locally high temperatures necessary for combustion. The chamber could process approximately two cubic feet per minute at cabin conditions, which would allow for processing the entire cabin atmosphere every two hours. The power requirement for a chamber of this capacity is approximately 20 watts. Two beds 12 of activated charcoal are illustrated, one of each will be in the line at all times. The flow of cabin gas is accomplished by means of the conduit 30, provided with a two-position valve 32 in the line. Thus, the spent air is alternately passed from the catalytic burning chamber 24, to the activated charcoal bed 12 in operation at the time. While one charcoal bed 12 is in operation, the other is removed from the line for purposes of regeneration. Regeneration of the activated charcoal beds is carried out by a combination of heating and reduction of pressure. The gases which are evolved during regeneration, together with whatever gases may be contained within the interstitial spaces of the bed, are released to vacuum by means of the line 34. The command necessary to remove a saturated charcoal bed from the line and to replace it with a regenerated bed is supplied by the timer control means 36.

The carbon dioxide passes via the conduit 38 to the silver oxide bed 14 where carbon dioxide is removed from the cabin gas. A pair of two-way valves permits the carbon dioxide to travel through the silver oxide bed or through the by-pass conduit 42, as desired. The absorption is obtained by converting the silver oxide to silver carbonate through the addition of carbon dioxide. The silver oxide bed is regenerated by removing it from the line through the switching valves 40. The first step in regeneration is to remove as much as possible of the inert gases remaining within the silver oxide bed and the associated conduits. This is done by pumping the gases through the pump 44 directly to the airstream via the line 46 to reduce the pressure within the silver oxide bed 14 in order to flush out the remains of inert gases. At this point the pump 44 is switched over the line 47 to the carbon dioxide storage vessel 52 (FIG. 1) and heating is applied to the silver oxide bed. Purge gas via line 48 from the carbon dioxide storage unit 52 is introduced, in small amounts, into the silver oxide bed to aid in flushing out these inert gases.

Control over the manner in which the silver oxide bed is heated for regeneration is important, since silver oxide will break down into silver and oxygen at approximately 300° C., not too much above that which is required to break silver carbonate down into silver oxide and carbon dioxide. The heating means employed are preferably screen heaters which can locate heating elements throughout the bed and the heating is then accomplished in a reasonably short length of time. If desired, a control circuit for the heater is included to maintain the temperature below the break-down temperature of silver oxide.

Figure 3:
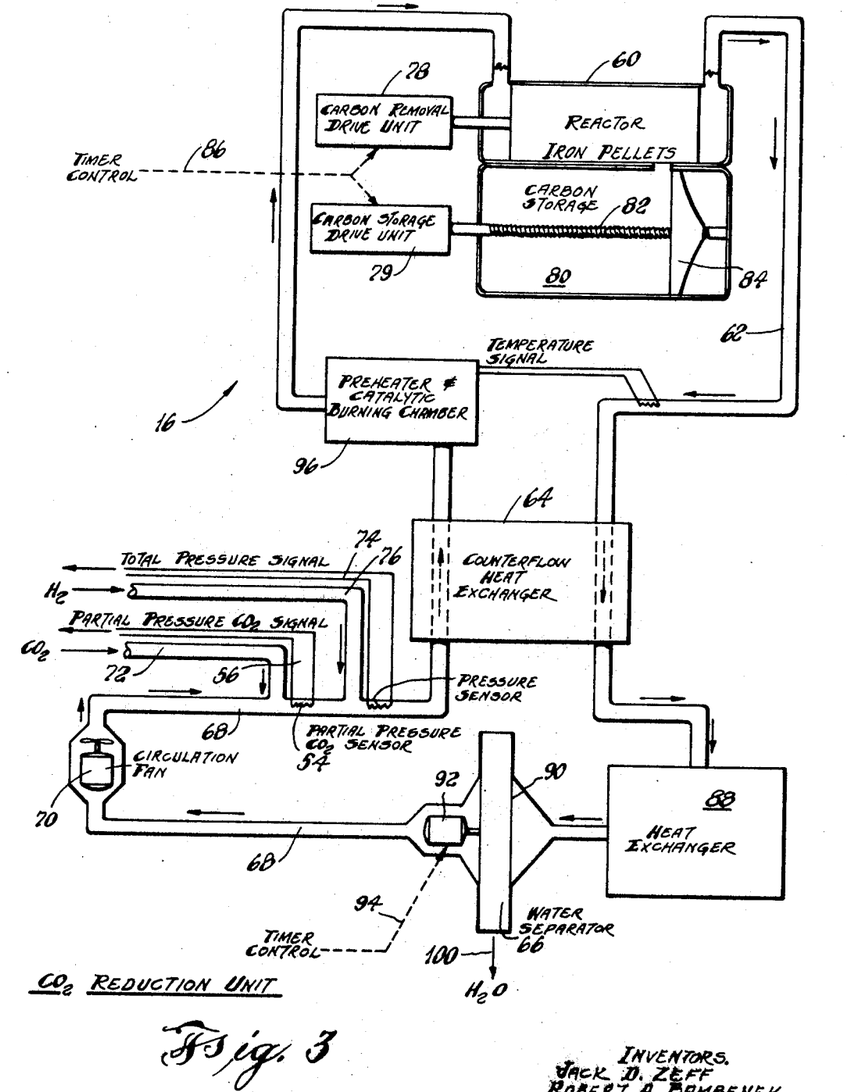
FIG. 3 provides a flow diagram of the carbon dioxide reduction step.

Extracted carbon dioxide is transferred via a check valve 49 and the conduit 47 to the flow control equipment 50 where it is accumulated within the storage vessel 52 (see FIG. 1). It is metered from this vessel into the carbon dioxide reduction unit 16 in order to maintain a given partial pressure. A sensor 54 (FIG. 3) within the carbon dioxide reduction unit 16 is used to provide a feedback signal 56 to the valve, in order to form a closed control loop. A pressure-sensitive safety valve 58 is provided on the carbon dioxide storage vessel 50 in order to release excess carbon dioxide to vacuum. The carbon dioxide reduction unit 16 is shown in detail in FIG. 3. Reaction takes place at 60 in the presence of a granulated iron catalyst at a temperature of 550° C. to 600° C. and at a pressure of two atmospheres. The reactor 60 consists of a cylinder of iron pellets, through which is passed the stream of carbon dioxide and hydrogen. The stream emerges from the reactor at 62 relatively rich in water vapor, and is then cooled to condense this water into liquid form. The water is then removed from the gas stream at 100, while in the heat exchanger 64, the stream is reheated via the conduit 68 and the circulation fan 70, and is recirculated through the reactor 60. As the partial pressure of carbon dioxide falls within the carbon dioxide reduction unit 16 due to its combination with the hydrogen, it is replenished from the carbon dioxide storage vessel 52 via the supply conduit 72 (see FIG. 1). In a similar manner, as the hydrogen is removed from the system in the form of water, the total pressure drops. This provides a signal 142 (FIG. 1) via line 74 (FIG. 3) which replenishes the supply of hydrogen within the system via conduit 76. The carbon that is produced by the reaction accumulates within the reactor 60 and must be removed periodically. In order to accomplish this, the iron pellets within the reactor are enclosed within a cylinder with a wall made of a fine mesh screen. When it is necessary to remove accumulated carbon from the reactor, the ends of the reactors are sealed off, and the carbon removal drive unit 78 subjects the reactor to a combination of rotation and axial vibration. The carbon formed by the reaction, which is in the form of fine particles of amorphous carbon, is forced outward by this motion, through the walls of the reactor, and into the carbon storage vessel 80. When the carbon has been removed from the reactor 60, the carbon storage drive unit 79 is activated. This unit operates a travelling screw 82 so as to move a piston 84 to compact the carbon removed from the reactor, and then return the piston to its original position. A timer control 86 is used to activate both drive units, so that carbon is removed from the reactor at timed intervals. The cooling of the emerging water rich vapor is accomplished in the counter-flow exchanger 64 that is also used to preheat the gases entering the reactor. The excess heat produced by the exothermic reaction is ejected to outer space by means of a heat exchanger 88. By this time the temperature of the gas is about cabin temperature, or 70° F. Gases are then sent to the centrifugal water separator 66 which includes a sponge 90 connected to an electric motor 92. The sponge acts as an accumulator of water droplets so that the motor may be operated only intermittently. Once again, a timer control 94 is used, to remove water from the system at fixed intervals. Emerging from the water separator, the gas stream is recycled via 68 with make-up hydrogen 76 and carbon dioxide 72 into the counter-flow heat exchanger 64, where it is again preheated to reaction temperature. From there, it enters the preheater and catalytic burning chamber 96, which is included for two purposes. The first of these is for heating when the system is started. The preheater will allow the reaction chamber and the hot end of the counter-flow heat exchanger 64 to be heated by gases circulating through the system. The amount of heating is regulated by the temperature of the gases emerging from the reactor 60, so that under steady conditions, the preheater 96 will add only the necessary amount of heat to make up for radiation losses. Secondly, the catalytic burning chamber is included here to continuously rid the system of reactive gases such as oxygen which could conceivably form an explosive mixture, if allowed to accumulate over any length of time. It may be seen here why it was necessary to obtain pure carbon dioxide, for impure additions into the carbon dioxide stream entering the reduction unit would be accumulated over a period of time within the unit, eventually impairing its operation.

The water flow control system 98 shown in FIG. 1, accepts the water which is ejected from the carbon dioxide reduction via the conduit 100 and stores it in a water storage unit 102. Water is removed from the unit by a solenoid operated piston pump, 104 and 106 respectively, which transfers a given amount of water into the electrolysis unit 18 in response to a pressure signal 107 when the pressure within the electrolysis unit 18 drops below a preset level. The amount of water formed by the carbon dioxide reduction unit, as will be seen later, is insufficient to supply the demands of the electrolysis unit. For this reason, the piston pump 106 is connected to the central water storage vessel 108, so that when the water storage unit that is fed by the carbon dioxide unit is empty, it may demand water from central water storage.

The electrolysis unit, shown in detail in FIG. 4, converts water into gaseous hydrogen and oxygen. The hydrogen is recirculated to the carbon dioxide reduction unit 16 via the conduit 110, and the oxygen is added into the airstream on demand via the conduit 112. The design of the electrolysis unit is dictated by the four basic functions which it performs.

First of all, it is a centrifuge. This would dictate that the unit be a surface of revolution. Also, it is desirable to have the centrifuge capable of operation in weightless as well as subgravity conditions. This would indicate that the outside of the electrolysis unit be at a lower level than the center, so that the stable water position is nearly the same in the gravity or zero gravity environment.

Secondly, the electrolysis unit must function as a relatively constant pressure source of oxygen. This is done here by allowing electrolysis to occur only when the oxygen pressure drops below a given level. In this manner, a minimum storage volume is necessary for the oxygen.

The third major requirement of the system is that it be able to either generate hydrogen on demand, or store hydrogen. Since the electrolysis process is being used to generate oxygen upon demand, it is necessary to store the hydrogen. Until now, the only requirement on the size of the electrolysis unit is that it be of sufficient radius to allow centrifugal force to be developed in order to hold the water against the outside wall. Although this does dictate some minimum volume, the volume within the electrolysis unit is not being used. It seems reasonable, therefore, to utilize this volume for hydrogen storage.

The fourth major concern in the design of the electrolysis unit is that it be designed as a pressure vessel. The advantage in generating oxygen and hydrogen under pressure is two-fold. First of all, the required storage volume is reduced, and secondly, the hydrogen that is generated by the electrolysis unit is used to maintain the total pressure in the carbon dioxide reduction unit, which is about two atmospheres. Generation of hydrogen under pressure eliminates the necessity for a pump to introduce the hydrogen into the carbon dioxide reduction unit. Of course, more energy is required to electrolize water under pressure than it would under some lower pressure. The increase in the electrical energy requirement would be the same as if the water were electrolizd at a lower pressure, and then the gaseous hydrogen and oxygen compressed to the higher pressure. However, considering the fact that the hydrogen must be compressed in any case, it is worthwhile to use the electrolysis process as a pump, rather than to provide a separate one. The requirement that the electrolysis unit operate as a pressure vessel would indicate that the use of curved shells would be profitable in minimizing the weight of the unit.

The electrical power input necessary for electrolysis is supplied via conductors 113, 114 and is introduced into the unit through two carbon bearings 115, 115a. The bearing 115 is retained between the stationary outer shell 117 and the rotary inner shell 119, and the bearing 115a is disposed between a flange on the upper end of a tubular drive shaft 119a and the bottom wall of the $O_2$ manifold. The shaft 119a is connected to a worm gear 116 which is driven by motor 116a through a worm (not shown) to effect rotation of the inner shell 119.

The bearings 115a, 115 transmit the current into the upper and lower halves of the hydrogen storage chamber 118 and 120 respectively. These chambers are insulated from each other by a separator 122, which also serves to separate the gaseous hydrogen from the gaseous oxygen, and extends below the water level to within a short distance of the outside shell. The vanes 124 are used on the outside of the hydrogen storage chamber to impart the angular velocity of the chamber to the water, and to act as the electrodes. A portion of the vanes are insulated so that when the water drops below a given level, it loses contact with the electrode portion of the vane, and electrolysis ceases. In this manner, a minimum water level is maintained within the electrolysis unit at all times, to afford a water seal between the hydrogen generation chamber 126 and the oxygen generation chamber 128.

The control of the electrolysis unit, so that it will supply oxygen upon demand and store hydrogen for the carbon dioxide reduction system, is accomplished by the use of a float valve 130, a hydrogen dump valve 132, and the water flow control equipment 134. The first effect of oxygen demand upon the electrolysis unit is to lower the pressure within the oxygen generation chamber 128. This would tend to raise the level of the water within the oxygen generation chamber, with a corresponding lowering of the water level in the hydrogen generation chamber. However, any reduction of the water level in the hydrogen generation chamber opens the float valve 130, which allows hydrogen to flow from the hydrogen generation chamber 126 to the hydrogen storage chamber 120, thus reducing the pressure within the hydrogen generation chamber. In this manner, the float valve acts to maintain equal water levels within both chambers, so that the overall effect of a reduction in oxygen pressure is to reduce the pressure in both generation chambers. The reduction in pressure in the outer chamber of the electrolysis unit is used to trigger the water flow control equipment 134, which on a reduction in pressure, will feed a measured amount of water into the electrolysis unit 18. This will raise the level of water in both chambers, so that contact is made with the electrode vanes 124, and electrolysis proceeds until the amount of water that was introduced by the water flow control equipment is electrolyzed. It is interesting to note that, during electrolysis, hydrogen is generated twice as fast by volume as oxygen, and thus, its pressure would tend to rise more quickly. If, however, the water level recedes within the hydrogen generation chamber, once again the hydrogen will be released into the hydrogen storage chamber.

The hydrogen dump valve 132 is used to insure that the hydrogen storage chamber is at a slightly lower pressure than the hydrogen generation chamber, so that when the float valve is opened, there will be flow into the storage chamber. The valve is controlled by a small spring-loaded piston 136 which connects the hydrogen generation chamber and the hydrogen storage chamber, so that the pressure difference between these chambers is exerted directly upon the piston. If, for instance, the pressure within the two chambers is the same, the small spring force would be sufficient to open the hydrogen dump valve 132, releasing hydrogen from the hydrogen storage chamber to the vacuum 138 of outer space and reducing the pressure within the storage chamber. This would continue until the pressure difference was sufficient to overcome the spring force and close the valve, at which time the hydrogen storage chamber would be at some slightly lower value of pressure, determined by the spring force. The hydrogen dump valve acts to maintain this minimum pressure difference. It will, of course, allow the pressure in the hydrogen storage chamber to drop below that value.

The hydrogen dump valve will normally operate to release excess hydrogen produced by the system. This excess hydrogen occurs for two reasons: first, the respiratory quotient of the crew is less than one, due to the chemical composition of the foods consumed. Therefore, water must be electrolyzed to furnish the additional oxygen (not returned in the form of carbon dioxide), and in so doing excess hydrogen is released. Secondly, leakage oxygen is made up by the electrolysis unit, which will also result in excess hydrogen.

Hydrogen flow is controlled at 140 from the electrolysis unit 18 by the pressure signal 142 (FIG. 1) from the carbon dioxide reduction unit 16. The pressure signal actuates a relay 144 which operates the solenoid valve 146 to feed hydrogen via line 76 to the carbon dioxide reduction unit 16. The oxygen from the electrolysis unit 18 is controlled by oxygen flow control means 148. The oxygen flow is controlled within the control means 148 by a solenoid valve 150 in response to a relay 152 actuated by a portion of the cabin gas passing into the dehumidifier 20 by line 154.

The dehumidifier 20, shown in FIG. 1, operates so as to reduce the temperature and partial pressure of water vapor within the cabin gas stream to conditions at 51° F. and 100% relative humidity, so that upon return to the cabin, and subsequent heating by excess body heat, the cabin gas will be maintained at a temperature of 70° F. and 50% relative humidity. The dehumidifier equipment consists of a heat exchanger 156, water separator 158, and a temperature controlled by-pass valve 160. A portion of the cabin gas stream 154 is routed through the heat exchanger 156, and is then recombined with the gases that by-pass the heat exchanger prior to passage through the water separator 158 and return to the cabin at 162. By reducing the amount of by-pass gases, the flow through the heat exchanger is increased, thereby increasing the total amount of heat rejection and reducing the final gas temperature. The water vapor in the cabin gas stream, in excess of the amount required to maintain the relative humidity of the cabin, will be condensed in the heat exchanger and removed by the centrifugal water separator 158, similar in design to the one used in the carbon dioxide reduction unit 16. The water that is produced in this fashion is removed via the conduit 164 to the central water storage, where it is used to supply the electrolysis unit and to make up any losses incurred by other systems.

The expected leakage rate of atmosphere from the cabin is expected to be on the order of 100 cc./min. at standard temperature and pressure. Provisions must be made for replenishing this volume rate of all the desirable components of the cabin atmosphere, i.e., oxygen, water vapor, and inert gas. The partial pressure of oxygen and water vapor are maintained at preset levels by the electrolysis unit 18 and the dehumidifier 20, respectively. The water vapor and oxygen necessary for make-up is stored in the form of liquid water, and is used as required.

The make-up of inert gas in the atmosphere may be provided by a storage vessel of inert gas, as indicated in FIG. 1 at 166. The addition of inert gas to the cabin atmosphere via 168 would be controlled by a simple pressure reducer 170 which would maintain the total pressure of the cabin at a given level.

Figure 5:
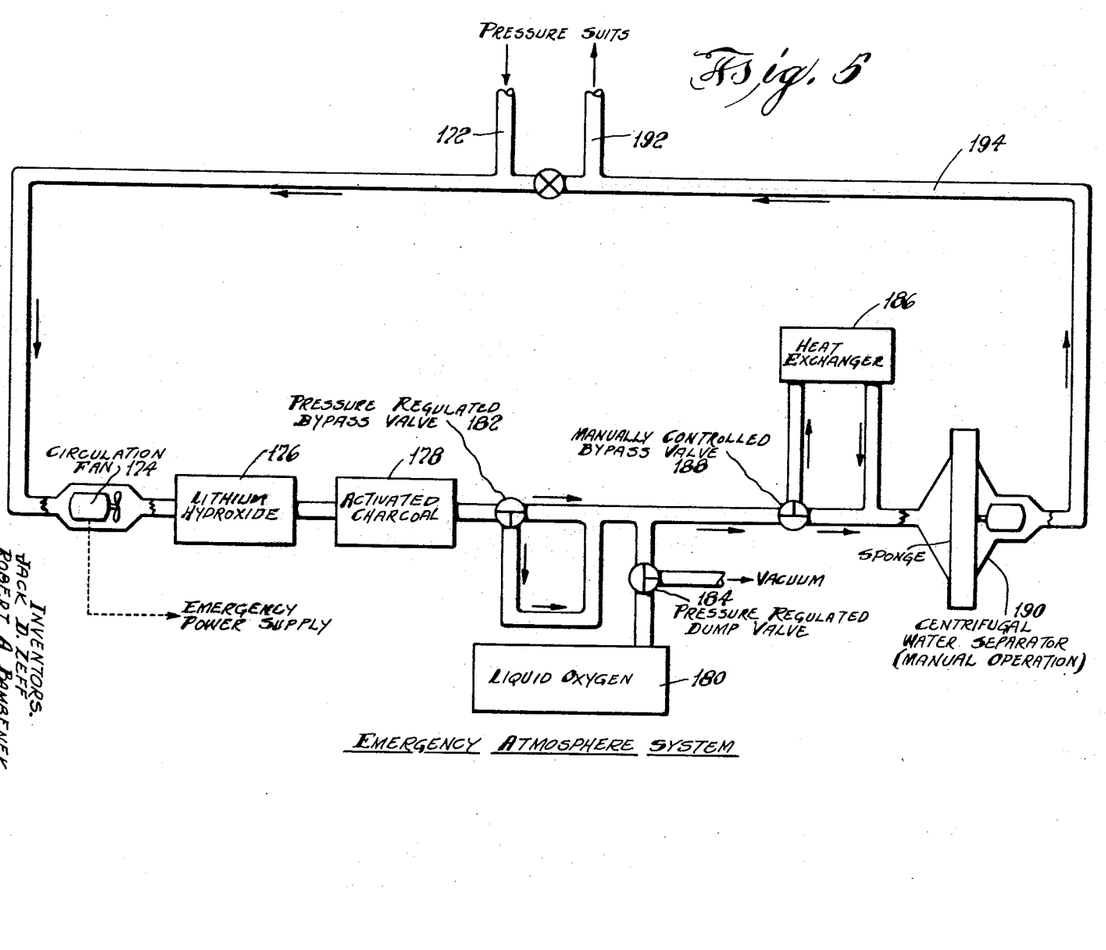
FIG. 5 illustrates the emergency atmosphere system.

The emergency atmosphere regeneration system, shown in FIG. 5, performs the functions of circulation, odor removal, carbon dioxide removal, oxygen addition, and dehumidification.

The system is designed to operate on minimum power, to be supplied by an independent power source. Manual control and operation are utilized for all functions that may be performed intermittently. The only equipment which requires continuous power is the circulation fan.

The emergency atmosphere system is normally filled with cabin gas and is brought into use at any time by connecting the pressure suit by means of connecting conduit 172 through the circulation fan 174 to the bed of lithium hydroxide 176 and activated charcoal 178, which remove odors and carbon dioxide from the atmosphere and are of sufficient size to last for approximately 14 days. This would preferably provide bed weights of approximately 2 pounds for the activated charcoal and 135 pounds for the lithium hydroxide. The generation rate of gaseous oxygen from liquid oxygen may be controlled by circulating a small amount of cabin gas around the liquid oxygen storage vessel 180. The valve 182 is a pressure-sensitive by-pass valve and by-passes more gas to heat the liquid oxygen whenever the system pressure drops, vaporizing more oxygen. Thus, the sensible heat of the cabin gas would supply the latent heat of vaporization to the liquid oxygen. When the system is not in operation, the excess oxygen would be vented overboard by means of the pressure-sensitive relief valve 184. The dehumidifier 186 is of the same design as that used within the operational system, except for manual operation. The final gas temperature is displayed and the by-pass valve 188 may be set manually. The centrifugal water separator 190 is designed for intermittent manual operation. A preliminary heat balance indicatse that the excess body heat absorbed by the system is more than enough to vaporize and heat the liquid oxygen to body temperature. The dehumidifier would reject the balance of the heat. The emergency gas is returned to the pressure suits via conduits 194 and 192. The emergency atmosphere system will be normally filled with cabin gas. It may be brought into use at any time by connecting a pressure suit and energizing the circulation fan.

The inventive concept is capable of being utilized with other methods of recovering oxygen. For example, FIG. 6 discloses, a carbon and electrolysis of water system that is designed to operate best in a zero or low g environment. The carbon dioxide from the cabin gas line 196 is collected in the concentrator 198 and in turn is fed via the line 200 in conjunction with hydrogen feed 202 to a mixing chamber 204. The gas mixture of hydrogen and carbon dioxide is then pumped at 206 into a reactor 208 which contains an iron shot catalyst 210. In this reactor the carbon dioxide is reduced to carbon and the hydrogen oxidized to water. A heating coil 212 embedded in the iron catalyst heats the reactor to the required temperature. Carbon is stored in the reactor 208 and is removed by the carbon removal drive unit 214. This reaction is exothermic and occurs between 300 and 500° C. The hot hydrogen-carbon dioxide water mixture is transferred via the conduit 216 to a counterflow heat exchanger 218. The mixture may be filtered at 220 first. The reaction products are cooled to approximately 100° C. in the heat exchanger 218 and are passed on via the conduit 222 to the condenser 224 and the water collection sponge 226. The sponge is placed in the line through which the water vapor-laden gases in the $CO_2$ reduction circuit are recycled. Water droplets are trapped onto the sponge surfaces. A solenoid actuated motor 228 is used to squeeze the water of the sponge and pump the water at 230 to the electrolysis unit 232. The action of the piston motor 228 may be periodic or upon demand. The unreacted carbon dioxide, hydrogen, and other gaseous products are recirculated via the line 234, through the heat exchanger 218 for preheating and are again introduced to the mixing manifold and the cycle repeats, with the addition of more carbon dioxide and hydrogen to replace the water removed via the high temperature line 236. The action of this piston 228 is triggered by a pressure sensor in the electrolysis cell. It should also be noted that the carbon is removed from the reactor 208 by centrifugal action simultaneously with the squeezing of the water sponge 226.

Figure 6:
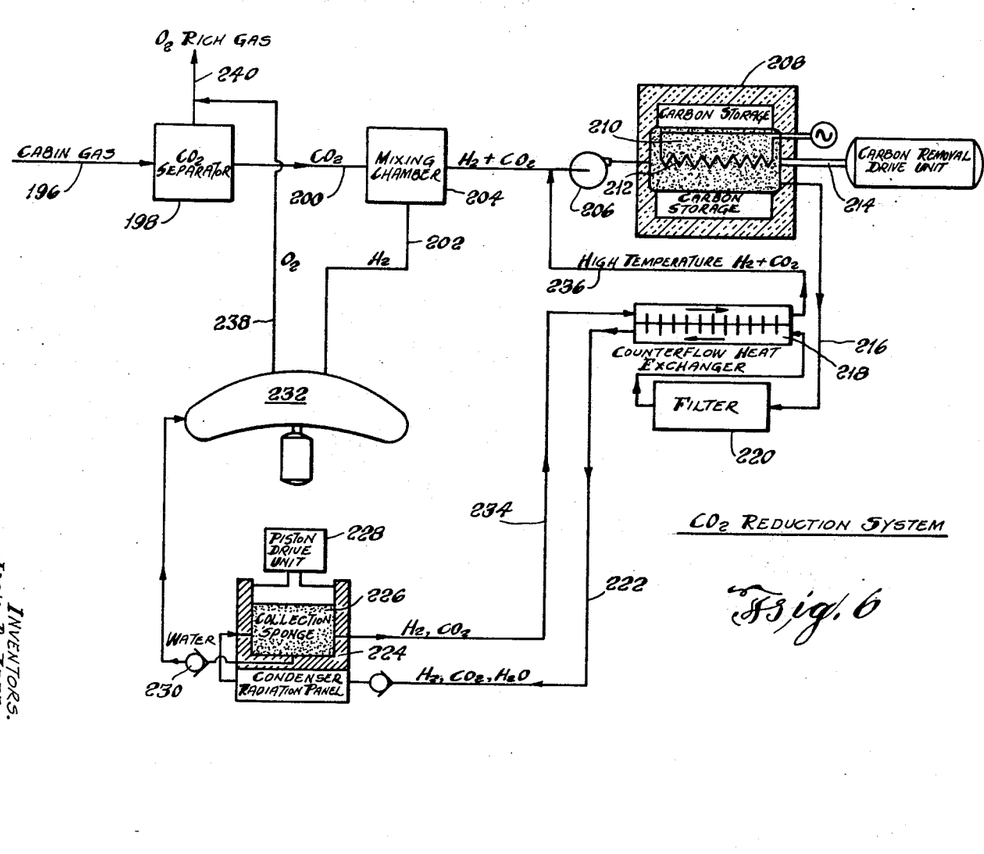
FIG. 6 is another form of the invention and is adapted to operate in a low $g$ environment to regenerate the atmosphere.

In the electrolysis cell 232 the water is converted into its elemental constituents, hydrogen and oxygen. This is generally similar to that described above. The recovered oxygen is returned via the conduit line 238 to mix with the free oxygen 240 from the carbon separator chamber 198. The system is kept under pressure by the addition of the water from the collection sponge. The quantity of oxygen generated can be controlled by regulating the current supplied to the electrode. Additional water from the water recovery unit is added, if necessary.

Obviously many modifications and variations of the present invention are possible in the light of the above teachings. It is therefore to be understood that within the scope of the appended claim the invention may be practiced otherwise than as specifically described.

What is claimed is:

1. The process of regenerating spent atmosphere which includes one or more undesirable component gases from the group consisting of hydrogen, methane, heavy hydrocarbons, sulfites, phosphites, carbon monoxide, and hydrogen sulfide, the process comprising the steps of:

passing the spent atmosphere through a catalytic oxidation chamber so as to oxidize hydrogen to form water vapor, carbon monoxide to form carbon dioxide, methane and other hydrocarbons to form carbon dioxide and water vapor;

passing the resulting atmosphere from the oxidation chamber through activated charcoal to remove from the atmosphere such sulfites, sulphides or phosphites as are present therein, thereby leaving carbon dioxide as the remaining undesirable component of the atmosphere;

passing the resulting atmosphere from the charcoal over a bed of silver oxide thereby absorbing the carbon dioxide so as to leave the atmosphere free of said undesirable components;

desorbing the absorbed carbon dioxide from the silver oxide;

reducing the carbon dioxide to carbon by subjecting it to hydrogen in the presence of a catalyst to produce water vapor;

condensing the water vapor into water;

electrolytically treating the water to obtain hydrogen and oxygen;

feeding the hydrogen to the carbon dioxide to aid in the reduction step; and mixing the oxygen with a portion of the atmosphere passing from the silver oxide bed to provide a regenerated atmosphere.

References Cited
UNITED STATES PATENTS

| | | | |
|---|---|---|---|
| 2,017,779 | 10/1935 | Vosburgh | 23—150 |
| 3,079,237 | 2/1963 | Taylor. | |
| 3,232,028 | 1/1966 | McDonald et al. | |
| 3,242,058 | 3/1966 | Ganley et al. | |

OSCAR R. VERTIZ, Primary Examiner

E. C. THOMAS, Assistant Examiner

U.S. Cl. X.R.

23—2, 209.4, 260, 288; 204—129